United States Patent
Geng et al.

(10) Patent No.: US 12,339,487 B2
(45) Date of Patent: Jun. 24, 2025

(54) PRISM SHEET AND DISPLAY MODULE

(71) Applicant: HUIZHOU CHINA STAR OPTOELECTRONICS DISPLAY CO., LTD., Guangdong (CN)

(72) Inventors: Yuqing Geng, Guangdong (CN); Fen Cao, Guangdong (CN); Guofeng Kuang, Guangdong (CN); Xinyu Wang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 18/560,715

(22) PCT Filed: Sep. 14, 2023

(86) PCT No.: PCT/CN2023/118876
§ 371 (c)(1),
(2) Date: Nov. 14, 2023

(87) PCT Pub. No.: WO2024/139422
PCT Pub. Date: Jul. 4, 2024

(65) Prior Publication Data
US 2025/0085469 A1    Mar. 13, 2025

(30) Foreign Application Priority Data
Dec. 29, 2022  (CN) .......................... 202211713882.7

(51) Int. Cl.
*F21V 8/00* (2006.01)
*G02F 1/13357* (2006.01)

(52) U.S. Cl.
CPC ..... *G02B 6/0053* (2013.01); *G02F 1/133615* (2013.01)

(58) Field of Classification Search
CPC ..................... G02B 6/0053; G02F 1/133615
See application file for complete search history.

(56) References Cited

FOREIGN PATENT DOCUMENTS

| CN | 101413641 A | 4/2009 |
|---|---|---|
| CN | 101477272 A | 7/2009 |
| CN | 103185287 A | 7/2013 |
| CN | 203909331 U | 10/2014 |
| CN | 105116598 A | 12/2015 |

(Continued)

OTHER PUBLICATIONS

Chinese Office Action issued in corresponding Chinese Patent Application No. 202211713882.7 dated Jul. 25, 2023, pp. 1-7.

(Continued)

*Primary Examiner* — Anne M Hines
*Assistant Examiner* — Jose M Diaz
(74) *Attorney, Agent, or Firm* — PV IP PC; Wei Te Chung

(57) ABSTRACT

The present application provides a prism sheet and a display module. The prism sheet includes a base layer and a plurality of prisms arranged on the base layer. The prism sheet is divided into a middle region and edge regions. By making the vertex angles of the portions of the prisms in the middle region smaller than the vertex angles in the edge regions, it may be possible to improve the brightness of the backlight module in the display module and optimize the horizontal viewing angle of the display module.

20 Claims, 2 Drawing Sheets

(56) References Cited

FOREIGN PATENT DOCUMENTS

| | | | |
|---|---|---|---|
| CN | 206038948 U | | 3/2017 |
| CN | 216526618 U | | 5/2022 |
| CN | 115390169 A | | 11/2022 |
| CN | 116125704 A | | 5/2023 |
| JP | 2004192909 A | | 7/2004 |
| JP | 2005340096 A | * | 12/2005 |
| JP | 2007041015 A | | 2/2007 |
| KR | 20140118406 A | | 10/2014 |

OTHER PUBLICATIONS

International Search Report in International application No. PCT/CN2023/118876, mailed on Dec. 5, 2023.
Written Opinion of the International Search Authority in International application No. PCT/CN2023/118876, mailed on Dec. 5, 2023.
Chinese Decision of Rejection issued in corresponding Chinese Patent Application No. 202211713882.7 dated Oct. 17, 2023, pp. 1-4.

* cited by examiner

PRISM SHEET AND DISPLAY MODULE

CROSS-REFERENCE TO RELATED APPLICATION

This application is a national stage of International Application No. PCT/CN2023/118876, filed on Sep. 14, 2023. The aforementioned application is hereby incorporated by reference in its entirety.

TECHNICAL FIELD

The present invention relates to the field of display technology, and in particular to a prism sheet and a display module.

BACKGROUND

With the upgrade of energy consumption standards in the display industry, in order to meet certification specifications and meet market demands, a prism sheet is usually used in a backlight module to increase backlight brightness and reduce energy consumption of the backlight module.

SUMMARY

Technical Problem

Prism structures arranged in parallel are usually used in the prism sheet in an existing backlight module. A vertex angle of each of the prism structures is a right angle, and thus the prism structure enables the light entering from a bottom surface of the prism sheet to converge to a front viewing angle. Although the display brightness at the front viewing angle can be improved, the viewing angle of the display module will be limited, so that standards of Swedish Confederation of Professional Employees (TCO) cannot be met. Therefore, it is necessary to provide a prism sheet and a display module to ameliorate the defect.

Solutions to the Technical Problem

Embodiments of the present application provide a prism sheet and a display module, which can not only improve the brightness of a backlight module in the display module and reduce the energy consumption of the display module, but also optimize a horizontal viewing angle of the display module.

Embodiments of the present application provide the prism sheet, the prism sheet includes a base layer and a plurality of prisms disposed on the base layer, each of the prisms extends along a first direction, the plurality of prisms are arranged side by side along a second direction, the first direction intersects the second direction.

In this case, the prism sheet is divided into a middle region and edge regions connected to the middle region, the edge regions are located on opposite sides of the middle region in the first direction, the prisms have vertex angles opposite to the base layer, and the vertex angles of portions of the prisms in the middle region are smaller than the vertex angles of portions of the prisms in the edge regions.

According to an embodiment of the present application, for each of the portions of the prisms in the edge regions, the vertex angles gradually increase from an end close to the middle region to an end away from the middle region.

According to an embodiment of the present application, the vertex angles of the portions of the prisms in the middle region are 90 degrees, and the vertex angles of the portions of the prisms in the edge regions are greater than 90 degrees.

According to an embodiment of the present application, edges of each of the prisms run through from the middle region to each of the edge regions without interruption.

According to an embodiment of the present application, in the second direction, a distance between edges of any two adjacent prisms in the middle region is equal to a distance between edges of the two adjacent prisms in each of the edge regions.

According to an embodiment of the present application, in the first direction, a ratio of a length of any one of the edge regions to a length of each of the prisms is greater than or equal to 1:4 and less than or equal to 1:3.

According to an embodiment of the present application, a cross section of each of the prisms is in a shape of an isosceles triangle.

According to an embodiment of the present application, a distance between a vertex and a bottom surface of each of the portions of the prisms in the edge region is less than a distance between a vertex and a bottom surface of the portion of the prisms in the middle region.

According to an embodiment of the present application, a refractive index of the prism sheet is between 1.6 and 1.7.

According to an embodiment of the present application, in each of the edge regions, the distance between the vertex and the bottom surface of the portion of the prisms gradually decreases from an end close to the middle region to an end away from the middle region.

According to the prism sheet provided in the embodiments of the present application, embodiments of the present application also provide a display module. The display module includes a display panel and a backlight module. The backlight module includes a backlight source and the prism sheet, the prism sheet is disposed on a light exit side of the backlight source, and the display panel is disposed on a light exit side of the backlight module.

The embodiments of the present disclosure have following beneficial effects. For the prism sheet and the display module provided in the embodiments of the present application, the display module includes the display panel and the backlight module, the backlight module includes the backlight source and the prism sheet, the prism sheet is disposed on the light exit side of the backlight source. The prism sheet includes the base layer and the plurality of prisms disposed on the base layer, the prisms each extend along the first direction, and the plurality of prisms are arranged side by side along the second direction, the first direction intersects the second direction. The prism sheet is divided into the middle region and the edge regions connected to the middle region, and the edge regions are located on two opposite sides of the middle region in the first direction. By making the vertex angles of the portions of the prisms in the middle region smaller than the vertex angles in the edge regions, not only can the brightness of the backlight module be improved, but also can the light from the backlight module be prevented from converging to the front viewing angle in the edge region. As a result, the horizontal viewing angle of the display module is optimized.

BRIEF DESCRIPTION OF THE DRAWINGS

In order to describe the embodiments or technical solutions in the prior art more clearly, accompanying drawings to be used in the description of the embodiments or the prior art will be briefly introduced below. Obviously, the accompanying drawings to be described below are merely accompanying drawings of some embodiments disclosed. For those of ordinary skill in the art, other drawings can be obtained based on these drawings without creative efforts.

DETAILED DESCRIPTION OF THE PREFERRED EMBODIMENTS

Figure 1:
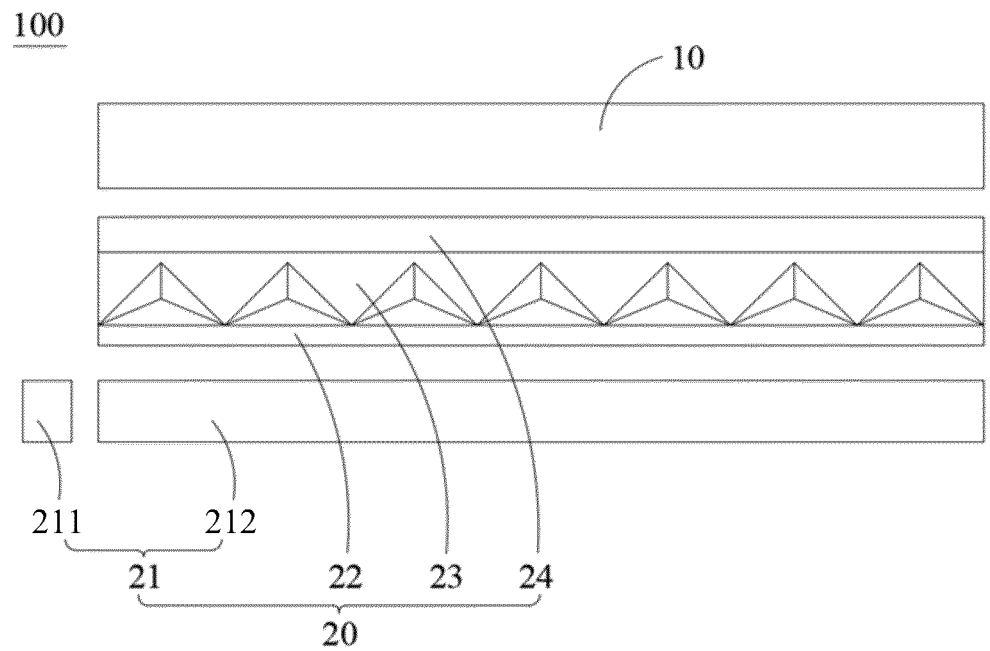
FIG. 1 is a schematic structural diagram of a display module provided in embodiments of the present application.

Those following description of the embodiments refers to the accompanying drawings to illustrate specific embodiments in which the present disclosure may be implemented. Directional terms mentioned in the present disclosure, such as [upper], [lower], [front], [back], [left], [right], [inner], [outer], [side], etc., are only referring to directions in the accompanying drawings. Therefore, the directional terms used are to explain and understand the present disclosure, but not to limit the present disclosure. In the drawings, units with similar structures are represented with a same number.

The present disclosure will be further described below in conjunction with the accompanying drawings and specific embodiments.

Embodiments of the present application provide a prism sheet and a display module, which may not only improve the brightness of a backlight module in the display module and reduce the energy consumption of the display module, but also optimize a horizontal viewing angle of the display module.

Referring to FIG. 1, FIG. 1 is a schematic structural diagram of the display module provided in embodiments of the present application. The display module 100 includes a display panel 10 and the backlight module 20. The backlight module 20 includes a backlight source 21 and the prism sheet 22 provided in the embodiments of the present application. The prism sheet 22 is disposed on a light exit side of the backlight source 21, and the display panel 10 is disposed on a light exit side of the backlight module 20.

Specifically, the display panel 10 is a liquid crystal display panel, and the display panel 10 may include: an array substrate and a color filter substrate that are arranged oppositely, and a liquid crystal layer disposed between the array substrate and the color filter substrate.

In embodiments of the present application, the liquid crystal display panel may be any one of, but is not limited to, a vertical alignment (VA) liquid crystal display panel, a twisted nematic (TN) liquid crystal display panel or an in-plane switching (IPS) liquid crystal display panel.

In an embodiment, as shown in FIG. 1, the backlight module 20 is an edge-lit backlight module. The backlight module 20 includes the backlight source 21 and the prism sheet 22, and the prism sheet 22 is disposed on the light exit side of the backlight source 21.

Specifically, the backlight source 21 includes a light source 211 and a light guide plate 212. The light source 211 may be a point light source or a linear light source. The light source 211 is disposed on a light entry side of the light guide plate 212. The prism sheet 22 is disposed above the light exit side of the light guide plate 212.

It will be noted that, in practical applications, the backlight module 20 is not limited to the edge-lit backlight module in the embodiments, but may also be a direct-lit backlight module, which is not limited here.

Further, the prism sheet 22 includes a base layer 220 and a plurality of prisms 221, and the plurality of prisms 221 are disposed on the base layer 220.

Figure 2:
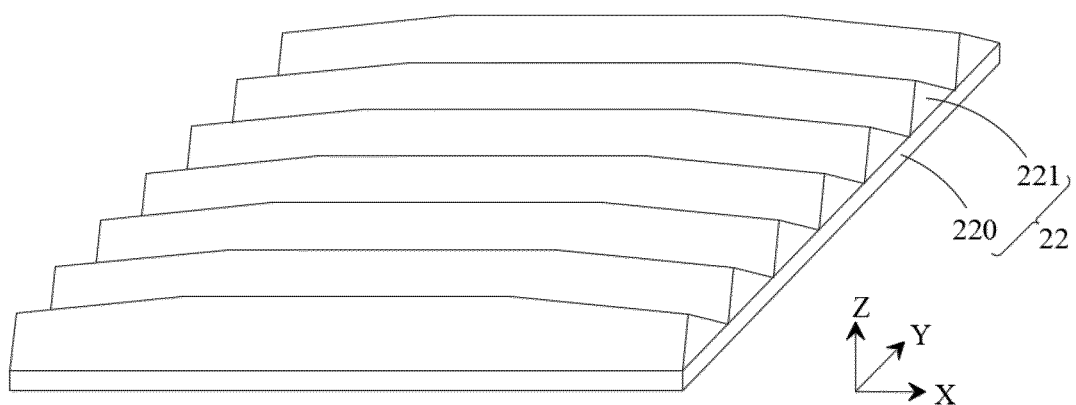
FIG. 2 is a schematic structural diagram of a prism sheet provided in embodiments of the present application.

As shown in FIG. 2, each of the prisms 221 extends along a first direction X, and the plurality of prisms 221 are arranged side by side on the base layer 220 along a second direction Y, the first direction X intersects the second direction Y. The first direction X may be regarded as a horizontal transverse direction, and the second direction Y may be regarded as a horizontal longitudinal direction. A third direction Z is perpendicular to both the first direction X and the second direction Y, and the third direction Z may be regarded as a thickness direction of the prism sheet 22.

In an embodiment, the prisms 221 are triangular prisms, and a cross section of each prism 221 parallel to the second direction Y and the third direction Z is in a shape of an isosceles triangle. The plurality of the prisms 221 are continuously arranged side by side on the base layer 220 along the second direction Y. For this structure, there is no need to engrave the prisms 221 one by one, thereby avoiding a significant increase in the difficulty of roller processing of the sheet and the engraving man-hours.

Further, the prism sheet 22 may be divided into a middle region CA and edge regions EA connected to the middle region CA. The edge regions EA are located on opposite sides of the middle region CA in the first direction X. The prisms 221 have vertex angles opposite to the base layer 220, and a vertex angle a1 of a portion of each prism 221 in the middle region CA is smaller than a vertex angle a2 of a portion of the prism 221 in each of the edge regions EA.

It will be noted that, since the brightness of the backlight module 20 is inversely proportional to the viewing angle of the display module 100, the greater the brightness of the backlight module 20, the worse (smaller) the viewing angle of the display module 100, and the less the brightness, the better (larger) the viewing angle. In the embodiments provided in the present application, the brightness of a portion of the backlight module corresponding to the middle region of the prism sheet 22 is improved by making the vertex angles of the portions of the prisms 221 in the middle region CA smaller than the vertex angles of the portions of the prisms 221 in the edge regions EA, thereby reducing the power consumption of the backlight module 20 and improving the energy efficiency of the backlight module 20. As a result, the display module 100 can meet regional energy efficiency standards such as standards of Energy Star (ES) or TCO. In addition, by sacrificing the brightness, at the front viewing angle, of a portion of the backlight module corresponding to each of the edge regions EA of the prism sheet 22, the display effect of the display module at the horizontal viewing angle may be improved, and thus the display module 100 may meet the viewing angle requirements of TCO.

Further, for the portions of the prisms in the edge region, the vertex angles gradually increase from an end close to the middle region to an end away from the middle region.

As shown in FIG. 2, for the portions of the prisms 221 in the edge regions EA, the vertex angles gradually increase from the end close to the middle region CA to the end away from the middle region CA. In this way, a difference between the vertex angles of the portions of the prisms 221 in the edge regions EA close to the middle region CA and the vertex angles in the middle region CA is reduced, and thus the transition of the prisms 221 from the middle region CA to each of the edge regions EA is more natural. As a result, it avoids a large step difference existing between each of the edge regions EA and the middle region CA, which easily forms a relatively obvious splicing gap.

Further, the vertex angles of the portions of the prisms in the middle region are 90 degrees, and the vertex angles of the portions of the prisms in the edge region are greater than 90 degrees.

Figure 4:
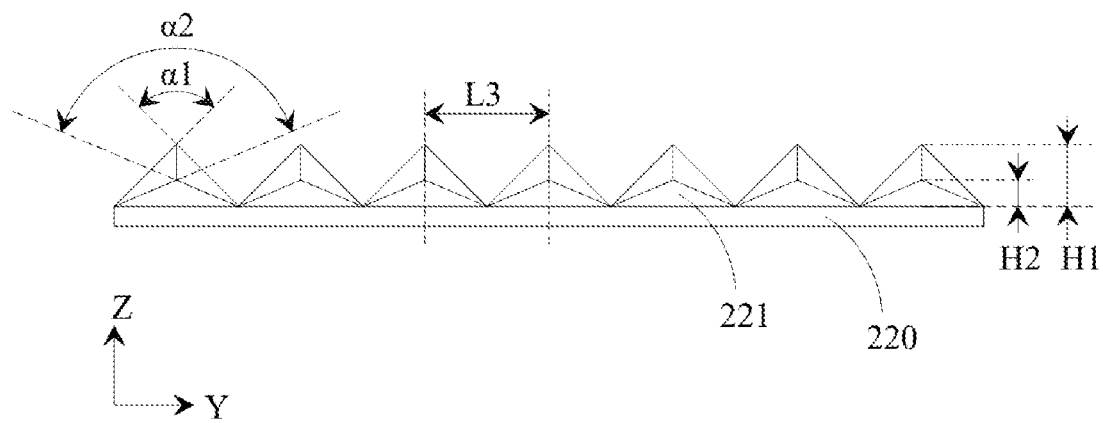
FIG. 4 is a side view of a prism sheet provided in embodiments of the present application.

In an embodiment, as shown in FIG. 4, the vertex angles $\alpha 1$ of the portions of the prisms 221 in the middle region CA each are a right angle. That is, $\alpha 1=90°$. The vertex angles $\alpha 2$ of the portions of the prisms 221 in the edge regions EA are greater than 90 degrees and less than or equal to 120 degrees. That is, in the edge regions EA, the vertex angles $\alpha 2$ of the portions of the prisms in each of the edge regions EA adjacent the middle region CA are close to 90 degrees, and the vertex angles at the ends of the prisms 221 away from the middle region CA are 120 degrees. The vertex angles $\alpha 2$ of the portions of the prisms 221 in the edge regions EA may gradually increase from 90 degrees to 120 degrees at the ends away from the middle region CA. In this way, it may avoid the obvious splicing gaps exiting in the prism sheet 22 at the junction of the middle region CA and each of the edge regions EA. In addition, the brightness and viewing angle of the display module may be improved, so that the energy efficiency of the display module meets the requirements of ES8.0 or even ES9.0, and the viewing angle of the display module meets the requirements of TCO.

In some other embodiments, the vertex angles $\alpha 1$ of the portions of the prisms 221 in the middle region CA are not limited to 90 degrees in the above embodiments, but may also be 89 degrees, 87 degrees or 85 degrees, etc., and the vertex angles $\alpha 1$ only need to be between 85 degrees and 90 degrees. The vertex angles $\alpha 2$ at the ends of the prisms 221 in the edge regions EA away from the middle region are not limited to 120 degrees in the above embodiments, but may also be 110 degrees, 115 degrees, 125 degrees, 130 degrees, 135 degrees or 140 degrees, etc.

Further, in the first direction, a ratio of a length of any edge region to a length of each of the prisms is greater than or equal to 1:4 and less than or equal to 1:3.

Figure 3:
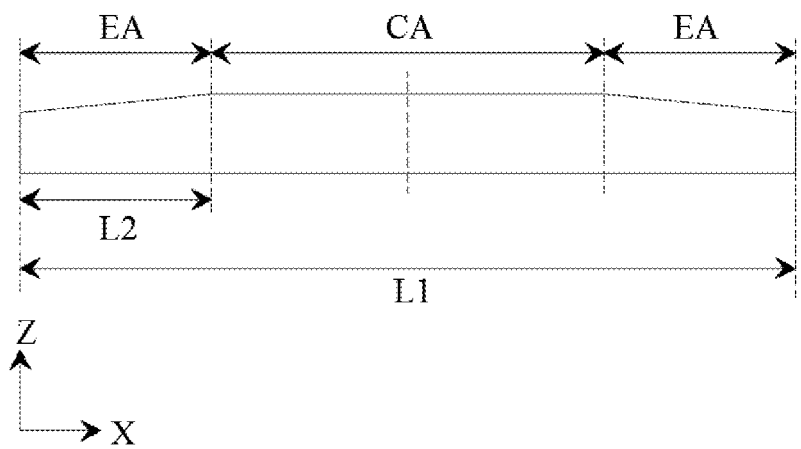
FIG. 3 is a front view of a prism sheet provided in embodiments of the present application.

In an embodiment, as shown in FIG. 3, the lengths of the prisms 221 in the first direction X are L1; the prisms 221 have two edge sub-regions, the two edge sub-regions are equal in length in the first direction X, and the lengths of the two edge sub-regions are both L2. The ratio of the length L2 of each edge sub-region to the length L1 of the prism 221 is 1:4.

It will be noted that, a distance between a TCO viewing angle measurement point and an edge of each of the edge regions EA accounts for one-tenth of the lengths L1 of the prisms 221. When the vertex angles $\alpha 2$ of the portions of the prisms 221 in the edge regions EA transition from the ends in the edge regions EA close to the middle region CA to the TCO viewing angle measurement point, the vertex angles $\alpha 2$ of the portions of the prisms 221 have transitioned from right angles to obtuse angles. Under the same haze, transmittance and refractive index, and compared with those with vertex angles at the TCO viewing angle measurement point being right angles, the prisms 221 have a better performance at the TCO viewing angle when the vertex angles are obtuse angles. Therefore, for the backlight module provided in the embodiments of the present application, the viewing angle of the display module may be improved and the probability that the display module meets the viewing angle requirements of TCO may be improved.

In practical applications, the ratio of the lengths L2 of the edge regions EA to the lengths L1 of the prisms 221 is not limited to 1:4 in the above embodiments, but may also be 1:3.8, 1:3.5, 1:3.3 or 1:3, etc., and the ratio only needs to be between 1:3 and 1:4. For this structure, the prism sheet 22 may be compatible with machine rollers with a similar size, and there is no need to customize a model for the prism sheet 22 provided in the embodiments of the present application.

In an embodiment, a distance between a vertex and a bottom surface of each of the portions of the prisms in the edge region is less than a distance between a vertex and a bottom surface of the portion of the prisms in the middle region.

Further, in the edge region, the distance between a vertex of and a bottom surface of each of the portions of the prisms gradually decreases from the end close to the middle region to the end away from the middle region.

As shown in FIG. 4, a distance between a vertex and a bottom surface of each of the portions of the prisms 221 in the middle region CA is H1; a distance between a vertex and a bottom surface of each of the portions of the prisms 221 in the edge regions EA is H2. The distance H1 between the vertex and the bottom surface of each portion of the prisms 221 in the middle region CA is greater than the distance H2 between the vertex and the bottom surface of each portion of the prisms 221 in the edge regions EA, and the distance H2 between the vertex and the bottom surface of each portion of the prisms 221 in the edge regions EA gradually decreases.

Further, in the second direction, a distance between edges of any two adjacent prisms in the middle region is equal to a distance between the edges of the two adjacent prisms in each edge region.

As shown in FIGS. 3 and 4, in the second direction Y, the distance between the edges of two adjacent prisms 221 in the middle region CA and the distance between the edges in both edge regions EA are equal, and are both L3.

Further, the display module further includes a diffusion sheet, and the diffusion sheet is disposed on a side of the prism sheet away from the backlight source. An optical adhesive layer is provided between the diffusion sheet and the prism sheet.

As shown in FIG. 1, the display module 100 further includes the diffusion sheet 24. The diffusion sheet 24 is disposed on the side of the prism sheet 22 away from the backlight source 21. The optical adhesive layer 23 is disposed between the diffusion sheet 24 and the prism sheet 22, so that the display module may have a better taste while the brightness gain is sufficient.

Further, a refractive index of the prism sheet 22 is between 1.6 and 1.7, a refractive index of the optical adhesive layer 23 is between 1.5 and 1.6, and a refractive index of the diffusion sheet 24 is between 1.6 and 1.7. It will be noted that, for each of the above-mentioned film layers' refractive index, the ranges include endpoint values.

In an embodiment, the refractive index of the prism sheet 22 is 1.65, the refractive index of the optical adhesive layer 23 is 1.55, and the refractive index of the diffusion sheet 24 is 1.65. In practical applications, the refractive index of the prism sheet 22 is not limited to 1.65 in the embodiments, but may also be 1.6, 1.63, 1.67 or 1.7, etc., the refractive index of the optical adhesive layer 23 is not limited to 1.55 in the embodiments, but may also be 1.5, 1.53, 1.57 or 1.6, etc., and the refractive index of the diffusion sheet 24 is not limited to 1.65 in the embodiments, but may also be 1.6, 1.63, 1.67 or 1.7, etc.

The embodiments of the present application have following beneficial effects. For the prism sheet and the display module provided in the embodiments of the present application, the display module includes the display panel and the backlight module, the backlight module includes the backlight source and the prism sheet, the prism sheet is disposed on the light exit side of the backlight source. The prism sheet includes the base layer and the plurality of prisms disposed on the base layer, the prisms each extend along the first direction, and the plurality of prisms are arranged side by side along the second direction, the first direction intersects the second direction. The prism sheet is divided into the middle region and the edge regions connected to the middle region, and the edge regions are located on two opposite sides of the middle region in the first direction. By making the vertex angles of the portions of the prisms in the middle region smaller than the vertex angles in the edge regions, not only can the brightness of the backlight module be improved, but also can the light from the backlight module be prevented from converging to the front viewing angle in the edge region. As a result, the horizontal viewing angle of the display module is optimized.

In summary, although the present application has been disclosed as above with preferred embodiments, the preferred embodiments are not intended to limit the present application. Those of ordinary skill in the art can make various changes and modifications without departing from the spirit and scope of the present application. Therefore, the protection scope of this application is based on the scope defined in the claims.

What is claimed is:

1. A prism sheet, comprising a base layer and a plurality of prisms disposed on the base layer, the prisms each extending along a first direction, the plurality of prisms being arranged side by side along a second direction, the first direction intersecting the second direction;
wherein the prism sheet is divided into a middle region and edge regions connected to the middle region, the edge regions are located on opposite sides of the middle region in the first direction, the prisms have vertex angles opposite to the base layer, and the vertex angles of portions of the prisms in the middle region are less than the vertex angles of portions of the prisms in the edge regions.

2. The prism sheet according to claim 1, wherein for each of the portions of the prisms in the edge regions, the vertex angles gradually increase from an end close to the middle region to an end away from the middle region.

3. The prism sheet according to claim 2, wherein the vertex angles of the portions of the prisms in the middle region are 90 degrees, and the vertex angles of the portions of the prisms in the edge regions are greater than 90 degrees.

4. The prism sheet according to claim 1, wherein edges of each of the prisms run through from the middle region to each of the edge regions without interruption.

5. The prism sheet according to claim 1, wherein in the second direction, a distance between edges of any two adjacent prisms in the middle region is equal to a distance between edges of the two adjacent prisms in each of the edge regions.

6. The prism sheet according to claim 1, wherein in the first direction, a ratio of a length of any one of the edge regions to a length of each of the prisms is greater than or equal to 1:4 and less than or equal to 1:3.

7. The prism sheet according to claim 6, wherein a distance between a vertex and a bottom surface of each of the portions of the prisms in the edge region is less than a distance between a vertex and a bottom surface of the portion of the prisms in the middle region.

8. The prism sheet according to claim 7, wherein in each of the edge regions, the distance between the vertex and the bottom surface of the portion of the prisms gradually decreases from an end close to the middle region to an end away from the middle region.

9. The prism sheet according to claim 1, wherein a cross section, parallel to the first direction and a third direction, of each of the prisms is in a shape of an isosceles triangle, the third direction is a thickness direction of the prism sheet.

10. The prism sheet according to claim 1, wherein a refractive index of the prism sheet is between 1.6 and 1.7.

11. A display module, comprising a display panel and a backlight module, wherein the backlight module includes a backlight source and a prism sheet, the prism sheet is disposed on a light exit side of the backlight source, and the display panel is disposed on a light exit side of the backlight module; the prism sheet includes a base layer and a plurality of prisms disposed on the base layer, the prisms each extends along a first direction, the plurality of prisms are arranged side by side along a second direction, the first direction intersects the second direction;
wherein the prism sheet is divided into a middle region and edge regions connected to the middle region, the edge regions are located on opposite sides of the middle region in the first direction, the prisms have vertex angles opposite to the base layer, and the vertex angles of portions of the prisms in the middle region are less than the vertex angles of portions of the prisms in the edge regions.

12. The display module according to claim 11, wherein for each of the portions of the prisms in the edge regions, the vertex angles gradually increase from an end close to the middle region to an end away from the middle region.

13. The display module according to claim 12, wherein the vertex angles of the portions of the prisms in the middle region are 90 degrees, and the vertex angles of the portions of the prisms in the edge regions are greater than 90 degrees.

14. The display module according to claim 11, wherein edges of each of the prisms run through from the middle region to each of the edge regions without interruption.

15. The display module according to claim 11, wherein in the second direction, a distance between edges of any two adjacent prisms in the middle region is equal to a distance between edges of the two adjacent prisms in each of the edge regions.

16. The display module according to claim 11, wherein in the first direction, a ratio of a length of any one of the edge regions to a length of each of the prisms is greater than or equal to 1:4 and less than or equal to 1:3.

17. The display module according to claim 16, wherein a distance between a vertex and a bottom surface of each of the portions of the prisms in the edge region is less than a distance between a vertex and a bottom surface of the portion of the prisms in the middle region.

18. The display module according to claim 17, wherein in each of the edge regions, the distance between the vertex and the bottom surface of the portion of the prisms gradually decreases from an end close to the middle region to an end away from the middle region.

19. The display module according to claim 11, wherein a cross section, parallel to the first direction and a third direction, of each of the prisms is in a shape of an isosceles triangle, the third direction is a thickness direction of the prism sheet.

20. A display module, comprising a display panel and a backlight module, wherein the backlight module includes a backlight source, a prism sheet and a diffusion sheet, the prism sheet is disposed on a light exit side of the backlight source, the diffusion sheet is disposed on a side of the prism sheet away from the backlight source; an optical adhesive layer is provided between the diffusion sheet and the prism sheet, the display panel is disposed on a light exit side of the backlight module; the prism sheet includes a base layer and a plurality of prisms disposed on the base layer, each of the prisms extends along a first direction, the plurality of prisms are arranged side by side along a second direction, the first direction intersects the second direction;

wherein the prism sheet is divided into a middle region and edge regions connected to the middle region, the edge regions are located on opposite sides of the middle region in the first direction, the prisms have vertex angles opposite to the base layer, and the vertex angles of portions of the prisms in the middle region are less than the vertex angles of portions of the prisms in the edge regions.

* * * * *